US010000191B2

(12) United States Patent
Wuerth et al.

(10) Patent No.: US 10,000,191 B2
(45) Date of Patent: Jun. 19, 2018

(54) BRAKE SYSTEM AND METHOD FOR CONTROLLING A BRAKE SYSTEM (71) Applicant: ROBERT BOSCH GMBH, Stuttgart (DE)

(72) Inventors: Gebhard Wuerth, Sulzbach-Laufen (DE); Volker Mehl, Weingarten (DE); Michael Kunz, Steinheim an der Murr (DE); Matthias Leiblein, Gerlingen (DE); Werner Quirant, Beilstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/463,762

(22) Filed: Mar. 20, 2017

(65) Prior Publication Data
US 2017/0190327 A1 Jul. 6, 2017

Related U.S. Application Data (63) Continuation of application No. 12/811,745, filed as application No. PCT/EP2008/065519 on Nov. 14, 2008, now Pat. No. 9,630,602.

(30) Foreign Application Priority Data

Jan. 14, 2008 (DE) ........................ 10 2008 004 201

(51) Int. Cl.
*B60T 15/00* (2006.01)
*B60T 8/26* (2006.01)
(Continued)

(52) U.S. Cl.
CPC ................ *B60T 8/267* (2013.01); *B60L 7/18* (2013.01); *B60T 11/22* (2013.01); *B60T 13/145* (2013.01);
(Continued)

(58) Field of Classification Search
CPC .... B60T 8/1766; B60T 8/266; B60T 2270/86; B60L 15/2009; B60L 2240/423; B60L 11/123; B60L 1/003; B60L 2240/463
(Continued)

(56) References Cited

U.S. PATENT DOCUMENTS 4,133,584 A    1/1979  Ohta et al.
4,550,372 A *  10/1985 Kahrs ................... B60T 13/585
                                                    303/152
(Continued)

FOREIGN PATENT DOCUMENTS

CN    1206378 A     1/1999
DE    19704248 A1   8/1998
(Continued)

*Primary Examiner* — Anna M Momper
*Assistant Examiner* — Mahbubur Rashid
(74) *Attorney, Agent, or Firm* — Norton Rose Fulbright US LLP; Gerard Messina (57) ABSTRACT

A brake system for a vehicle having a master brake cylinder, which provides a pressure signal, having a brake-medium reservoir connected to the master brake cylinder, and a first brake circuit, which is coupled by a first input to the master brake cylinder and by a second input to the brake-medium reservoir, and having at least one first wheel-brake cylinder, which is mounted at a first wheel, in order to exert a force corresponding to the pressure signal onto the first wheel, and having a separator valve, which is configured between the first input and the first wheel-brake cylinder, to prevent further transmission of the pressure signal upon receipt of a supplied closing signal; and having a control valve, which is configured between the first input and the first wheel-brake cylinder; in order to control an inflow of a brake medium from brake-medium reservoir to the first wheel-brake cylinder. In addition, a method for controlling a corresponding brake system is also described.

11 Claims, 3 Drawing Sheets (51) Int. Cl.
*B60T 11/22* (2006.01)
*B60T 13/68* (2006.01)
*B60T 13/14* (2006.01)
*B60T 13/74* (2006.01)
*B60L 7/18* (2006.01)

(52) U.S. Cl.
CPC .......... *B60T 13/686* (2013.01); *B60T 13/745* (2013.01); *B60T 2270/604* (2013.01); *B60T 2270/82* (2013.01)

(58) Field of Classification Search
USPC ........................................................ 303/112
See application file for complete search history.

(56) References Cited

U.S. PATENT DOCUMENTS

| | | | |
|---|---|---|---|
| 5,236,256 A | 8/1993 | Schmidt et al. | |
| 5,769,509 A | 6/1998 | Feigel et al. | |
| 5,895,100 A * | 4/1999 | Ito | B60L 7/26 188/156 |
| 5,961,189 A | 10/1999 | Lutteke et al. | |
| 6,023,649 A | 2/2000 | Matsuura et al. | |
| 6,231,134 B1 | 5/2001 | Fukasawa et al. | |
| 6,354,672 B1 * | 3/2002 | Nakamura | B60T 8/367 188/358 |
| 2001/0038243 A1 * | 11/2001 | Isono | B60K 6/365 303/116.1 |
| 2004/0004394 A1 * | 1/2004 | Ganzel | B60T 8/26 303/114.1 |
| 2006/0087173 A1 | 4/2006 | Kajiyama et al. | |
| 2007/0114844 A1 | 5/2007 | Maki et al. | |
| 2007/0284937 A1 * | 12/2007 | Deiml | B60K 6/48 303/115.3 |
| 2007/0296264 A1 | 12/2007 | Haupt et al. | |
| 2008/0236959 A1 * | 10/2008 | Hashida | B60T 8/4077 188/72.2 |
| 2010/0206673 A1 * | 8/2010 | Hitzel | B60L 7/24 188/106 R |

FOREIGN PATENT DOCUMENTS

| | | |
|---|---|---|
| DE | 19905660 A1 | 5/2000 |
| DE | 102005039314 A1 | 2/2007 |
| DE | 102005046055 A1 | 3/2007 |
| EP | 0388634 A1 | 9/1990 |
| JP | H06153316 A | 5/1994 |
| JP | H11208436 A | 8/1999 |
| JP | 20022463 A | 1/2002 |
| JP | 2005119427 A | 5/2005 |
| JP | 2005231395 A | 9/2005 |
| JP | 2005280596 A | 10/2005 |
| JP | 2006137221 A | 6/2006 |
| JP | 2007308097 A | 11/2007 |
| RU | 2155685 C2 | 9/2000 |
| WO | 0074987 A1 | 12/2000 |

* cited by examiner

BRAKE SYSTEM AND METHOD FOR CONTROLLING A BRAKE SYSTEM

CROSS REFERENCE TO RELATED APPLICATIONS

The present application is a continuation application of U.S. patent application Ser. No. 12/811,745, filed Jul. 6, 2010, which is a national phase to International Application No. PCT/EP2008/065519, filed Nov. 14, 2008, and claims priority to German Patent Application No. 10 2008 004 201.3, filed Jan. 14, 2008, all of which are hereby incorporated by reference in their entireties.

FIELD OF THE INVENTION

The present invention relates to a brake system for a motor vehicle. In addition, the present invention relates to a method for controlling a brake system for a motor vehicle.

BACKGROUND INFORMATION

Hybrid vehicles have a brake system that is designed for recuperative braking. In recuperative braking, an electric motor of the hybrid vehicle, typically, the electric drive motor, is operated in generator mode. Following an intermediate storage, the electrical energy recovered during recuperative braking may be used for an acceleration of the vehicle. This reduces any power loss experienced by a conventional vehicle due to frequent braking during a drive. As a result, the energy consumption and the pollutant emissions of the hybrid vehicle are reduced in comparison to the conventional vehicle.

To ensure that the recuperative braking have as little effect as possible on the braking distance of the vehicle, it is necessary that the braking system of the vehicle be adapted to specific situations. For example, in the case of a full electrical energy-storage device, the braking system should generate the entire braking torque via the conventional brake, in particular, via at least one friction brake, since, in such a situation, the recuperative brake mostly does not exert any braking torque on the wheels.

Moreover, operating the electric motor in generator mode typically requires a certain minimum speed of the vehicle. Therefore, a recuperative braking system is frequently not able to exert a braking torque on the wheels of a vehicle until the vehicle traveling ahead is at a standstill. Therefore, when a vehicle stops, the conventional brake system must compensate in the low speed range for the loss of braking action of the recuperative brake by generating a higher braking torque.

On the other hand, in many situations, it is desirable to exert a lowest possible hydraulic braking force on the wheels in order to achieve a high degree of recuperation. For example, following the gearshift processes, the decoupled generator often intervenes as a recuperative brake in order to shift the braking action again toward recuperative braking. If the total braking torque is to be kept constant in the process, then the conventional friction brake portion must be reduced correspondingly.

Processes where the braking torque of the conventional friction brake is adapted to the active braking torque of the recuperative brake in order to maintain a desired total braking torque, are often referred to as blending processes. In many vehicles having a recuperative brake, the blending is implemented by the driver actuating the brake input element. In the process, the driver assumes the task of deceleration controller. In the case of a discontinued or added recuperative braking torque, the driver uses the pedal to adapt the conventional braking torque in such a way that an overall deceleration desired by him/her is maintained. However, this process requires a greater expenditure of effort on the part of the driver.

Brake-by-wire brake systems, such as EHB electrohydraulic brake systems, for example, provide an option for controlling a total deceleration of a vehicle that is less work-intensive. In the case of a brake-by-wire brake system, the braking torques can be blended by decoupling the pedal, without the driver having to additionally actuate the pedal or another brake input element. Therefore, in the case of a brake-by-wire brake system, the driver hardly notices the blending processes. However, conventional brake-by-wire brake systems are expensive due to the complex electronics and mechanics/hydraulics that they require.

SUMMARY OF THE INVENTION

The exemplary embodiments and/or exemplary methods of the present invention provides a brake system for a vehicle having the features described herein and a method for controlling a brake system for a vehicle having the features described herein.

In this context, the pressure signal is understood, for example, to be a power transmitted from the master brake cylinder to the at least one first wheel-brake cylinder, or a transmitted pressure. This transmitted power induces the first wheel-brake cylinder to exert a braking torque on the first wheel assigned thereto. In this context, the first brake circuit encompasses at least the first wheel-brake cylinder. It is self-evident that the first brake circuit may also have at least one further wheel-brake cylinder that is assigned to at least one further wheel.

The exemplary embodiments and/or exemplary methods of the present invention is based on the realization that it is advantageous for a blending of a recuperative brake and a conventional friction brake when a first brake circuit of a brake system is decouplable from the master brake cylinder. In this case, the driver no longer controls the first brake circuit directly via the brake pedal and the master brake cylinder. Once the first brake circuit is decoupled from the master brake cylinder, it is additionally advantageous to have the option to control the at least one first wheel-brake cylinder of the first brake circuit using a second approach that takes the blending into consideration. Moreover, the exemplary embodiments and/or exemplary methods of the present invention takes into consideration the best way to cost-effectively implement the options described in the above paragraph. To that end, a separator valve is configured between the master brake cylinder and the first wheel-brake cylinder that, by a closing of the same, prevents the pressure signal from being transmitted to the first wheel-brake cylinder and thus decouples the first wheel-brake cylinder from the master brake cylinder. In addition, the first brake circuit is connected directly to the brake medium reservoir, and a control valve is configured at such close proximity to the connection of the first brake circuit at the braking medium reservoir that an inflow of the braking medium from the braking medium reservoir to the first wheel-brake cylinder is controllable by the control valve. In this manner, a braking pressure at the first wheel brake cylinder may be controlled by the control valve. In this case, the control valve also controls the force that the first wheel-brake cylinder exerts on the first wheel. Thus, the braking torque exerted on the first wheel may be controlled by the control valve.

Thus, by using a sensor or by applying an estimation, it is possible to ascertain which total braking torque is desired by the driver, which actual recuperative braking torque is exerted by the recuperative brake, which hydraulic braking torque is applied by the conventional braking system, and what difference still exists between the desired total braking torque and the active recuperative braking torque. The braking torque corresponding to the ascertained difference may subsequently be exerted by the control valve on the first wheel. This renders possible a blending, without the driver having to expend additional work for that purpose. Thus, a sufficient recuperation efficiency is ensured at reasonable cost.

However, the exemplary embodiments and/or exemplary methods of the present invention is not limited to an application in a hybrid vehicle. For example, a transversal acceleration-dependent brake-force distribution may also be implemented by the exemplary embodiments and/or exemplary methods of the present invention. In the case of a transversal acceleration-dependent brake-force distribution, the brake force at some of the wheels of the vehicle, which may be at the two rear-axle wheels, is apportioned in accordance with a vertical force that occurs during a travel around a curve. In this manner, the frictional coefficient of the wheels, most notably the frictional coefficient of the two rear wheels, is adapted to the transversal acceleration. This permits a more stable braking of the vehicle in curves. To determine a braking torque that is to be exerted upon a wheel of the vehicle, a transversal acceleration ascertained by a sensor device may be used.

In addition, a use of the exemplary embodiments and/or exemplary methods of the present invention is practical for a dynamic braking in a curve. In the case of dynamic curve braking, the braking force at a wheel on the inside of the curve is increased relative to the braking force at a wheel on the outside of the curve. This achieves a more dynamic handling performance.

In addition, the exemplary embodiments and/or exemplary methods of the present invention may also be used for a more advantageous braking when driving in reverse. In particular, by increasing the braking force at the rear axle, a better brake-force distribution is adjusted for a driving in reverse. In this context, one also speaks of a reverse brake-force distribution. Most notably, this permits a substantially more stable braking performance in the case of a slow reverse travel on a downgrade.

As can be inferred from the above paragraphs, the application of the present invention is thus not limited to hybrid vehicles. Instead, the braking performance of other vehicle types may likewise be improved through application of the exemplary embodiments and/or exemplary methods of the present invention. To realize the options described in the above paragraphs, the first brake circuit is decoupled from the master brake cylinder. The at least one first wheel-brake cylinder of the first brake circuit is then controlled by the control valve in such a way that a braking torque adapted to the current driving situation is exerted on the at least one first wheel.

In addition, the exemplary embodiments and/or exemplary methods of the present invention at least better ensures that an option is provided for improving the pedal feel by decoupling the first brake circuit, so that the driver no longer needs to control the first brake circuit directly via a force that is exerted on the brake pedal. The pedal travel is also able to be shortened in this manner. The exemplary embodiments and/or exemplary methods of the present invention offers a simple-to-implement and inexpensive alternative to a conventional brake-by-wire brake system that, in particular, is very advantageous for rear-wheel-drive or all-wheel-drive vehicles. However, the exemplary embodiments and/or exemplary methods of the present invention may also be used for the front-wheel drive featuring a by-wire front-wheel axle.

For example, the control valve may be set to a closed state, an open state, and to at least one intermediate state between the closed state and the open state. In particular, the control valve may be a continuously adjustable valve. Thus, this relatively cost-effective specific embodiment of the control valve ensures a controlling of the first wheel-brake cylinder for a blending of the recuperative braking torque, a transversal acceleration-dependent brake-force distribution, a dynamic curve braking and/or an increase in the brake force at the rear axle.

One specific embodiment provides for a first branch point to be configured between the second input of the first brake circuit and the control valve, the first wheel-brake cylinder being coupled to the first branch point in such a way that an outflowing of the brake medium from the first wheel-brake cylinder to the brake-medium reservoir is directed past the control valve. Since, typically, only one comparatively low internal pressure prevails in the brake-medium reservoir, virtually no force counteracts the inflowing brake medium. Thus, the described specific embodiment renders possible a rapid reduction in a braking pressure at the first wheel-brake cylinder. In this context, between the first branch point and the first wheel-brake cylinder, a wheel-outlet valve is configured that is designed to direct the outflowing of the brake medium from the first wheel-brake cylinder past the control valve to the brake-medium reservoir.

In another specific embodiment, an output of the control valve and an output of the separator valve are coupled to a second branch point, a first wheel-inlet valve being configured between the second branch point and the first wheel-brake cylinder that is designed to direct the inflow of the brake medium from the second branch point to the first wheel-brake cylinder. In this manner, it is possible to reliably control the build-up of a brake pressure at the first wheel-brake cylinder.

In one advantageous further embodiment, a third branch point, to which a suction side of a first pump is coupled, is configured between the second input of the first brake circuit and the control valve, the delivery side of the first pump being coupled to the first wheel-inlet valve. The pump is used for a brake-by-wire pressure build-up.

In addition, the brake system may include a second brake circuit that is coupled by a third input to the master brake cylinder, including a second wheel-brake cylinder configured at a second wheel that is connected to the third input in such a way that the pressure signal is transmittable from the master brake cylinder to the second wheel-brake cylinder, and that is designed to exert a force corresponding to the pressure signal onto the second wheel, the second brake circuit having a second pump. The second brake circuit may be configured to not be decouplable from the master brake cylinder. Thus, the driver has the option of performing a direct braking intervention into the second brake circuit by actuating the brake input element. In this context, one specific embodiment provides for a recuperative brake to be connected to the second brake circuit. Other sensors may be connected to the brake system in order to record the driver's braking intention.

In a further refinement of the exemplary embodiments and/or exemplary methods of the present invention, the brake system has a motor that is operable in a first direction of rotation and in a second direction of rotation; in the case of an operation of the motor in the first direction of rotation, the first pump being operable by the motor, and the second pump being decoupled from the motor; and, in the case of an operation of the motor in the second direction of rotation, the first and the second pump being operable by the motor. Thus, an automatic joint operation of the second pump is preventable by the motor in the case of a requisite operation of the first pump.

In another exemplary embodiment, the second brake circuit is switchable into a first state and a second state, which are designed in such a way that a driving of the second pump of the second brake circuit that is switched into the first state effects a change in pressure at the second wheel-brake cylinder, and a driving of the second pump of the second brake circuit that is switched into the first state effects a circulating flow of the brake medium in the second brake circuit. This is able to be implemented, for example, in that the second brake circuit has a nonreturn valve configured between the switchover valve and the second pump, and a valve configured in parallel to the second pump, the second brake circuit being switchable by a closing of the valve into the first state and by an opening of the valve into the second state. This ensures that there is another option for preventing an undesired joint operation of the second pump in the case of a driving of the first pump by the motor.

The advantages described in the paragraphs above are also ensured by a suitable method.

Other features and advantages of the exemplary embodiments and/or exemplary methods of the present invention are explained in greater detail in the following with reference to the figures.

DETAILED DESCRIPTION

The brake system described in the following paragraphs is not only suited for use in a hybrid vehicle. Instead, the brake system may also be used in conventional vehicles, for example, to ensure a brake-force distribution at the wheels of the vehicle in the case of a braking during cornering and/or a travel in reverse.

Figure 1:
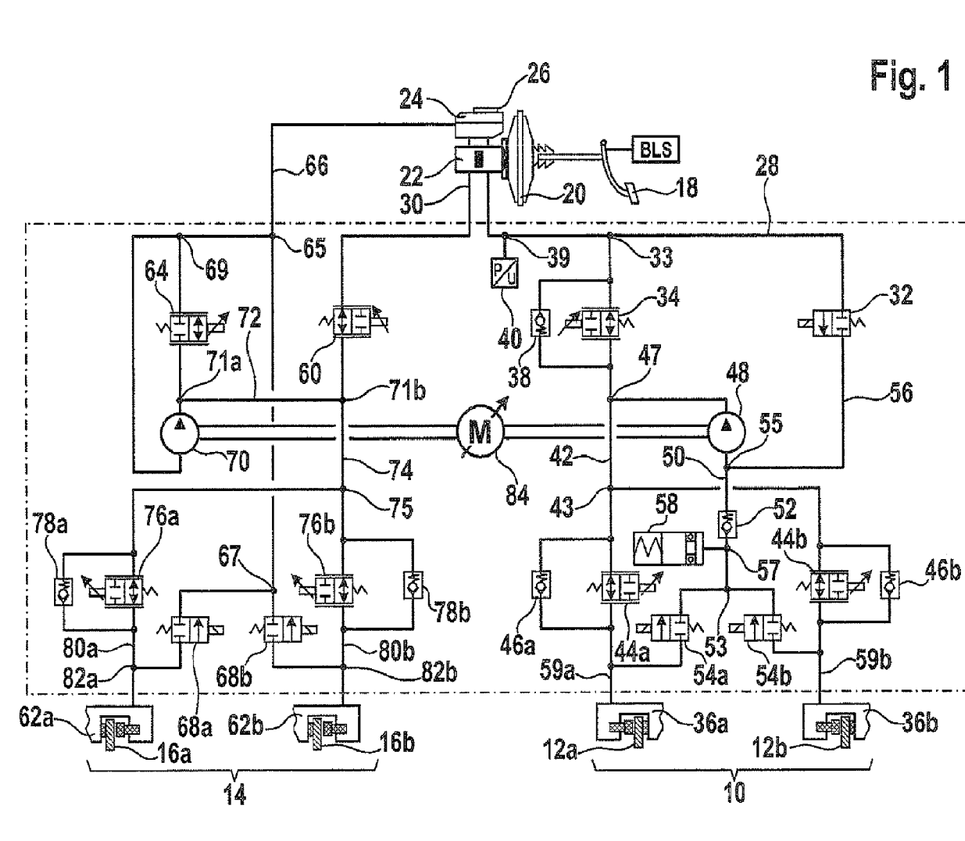
FIG. 1 shows a circuit diagram of a first specific embodiment of the brake system.

FIG. 1 shows a circuit diagram of a first specific embodiment of the brake system.

The brake system illustrated in FIG. 1 encompasses a front brake circuit 10 for braking front wheels 12a and 12b and a rear brake circuit 14 for braking rear wheels 16a and 16b. However, the illustrated example is not limited to this distribution of wheels 12a, 12b, 16a and 16b. It is self-evident that the example is also applicable to a specific embodiment where wheels 12a and 12b are the rear wheels and wheels 16a and 16b are the front wheels of a vehicle. Wheels 12a and 12b and wheels 16a and 16b may also be two pairs of wheels that are configured on two different sides of a vehicle or diagonally with respect to a vehicle.

It is explicitly noted in this case that the brake system illustrated in FIG. 1 is not limited to the fixed number of four wheels 12a, 12b, 16a and 16b. Instead, the brake system may be expanded to include the control of a greater number of wheels. For example, the brake system then includes at least two brake circuits that correspond to front brake circuit 10.

The brake system includes a brake pedal 18 to allow the driver to input a brake command to the brake system. A pedal-travel sensor, a booster membrane-displacement sensor and/or a rod-displacement sensor may also be mounted on brake pedal 18. Alternatively or in addition to brake pedal 18, the brake system may also include another brake-input element for recording a brake command.

Brake pedal 18 is connected via a brake booster 20 to a master brake cylinder 22. A brake-medium reservoir 24, for example, a hydraulic-fluid reservoir, is installed at master brake cylinder 22. Brake-medium reservoir 24 is fillable with a brake fluid via a filler inlet 26.

Brake-medium reservoir 24 is connected to master brake cylinder 22 in a way that allows a brake fluid to flow from master brake cylinder 22 into brake-medium reservoir 24. In the same way, depending on the pressure ratio, the brake fluid may flow from brake-medium reservoir 24 into the master brake cylinder 22.

A first feed line 28 for front brake circuit 10 and a second feed line 30 for rear brake circuit 14 lead to master brake cylinder 22. First feed line 28 extends between master brake cylinder 22 and a high-pressure switching valve 32 of front brake circuit 10. In addition, a changeover valve 34 is connected via a branch point 33 to feed line 28. Thus, a brake fluid stream emanating from master brake cylinder 22 may flow via feed line 28, optionally via high-pressure switching valve 32 or via changeover valve 34, in the direction of the wheel-brake cylinders of brake calipers 36a and 36b of wheels 12a and 12b.

A bypass line having a nonreturn valve 38 is configured in parallel to changeover valve 34. In the event that changeover valve 34 malfunctions, which would otherwise interrupt the hydraulic connection between master brake cylinder 22 and the wheel-brake cylinders of brake calipers 36a and 36b provided by changeover valve 34, nonreturn valve 38 ensures a continuation of the hydraulic connection between master brake cylinder 22 and the wheel-brake cylinders of brake calipers 36a and 36b. Thus, brake calipers 36a and 36b may be controlled by brake pedal 18 even during a loss of function of changeover valve 34.

A pressure sensor 40 is also connected via a branch point 39 to feed line 28. Pressure sensor 40 is designed to determine a pressure of the brake fluid in front brake circuit 10.

A line 42 extends from a side of changeover valve 34 facing away from feed line 28, to a wheel-inlet valve 44a that is assigned to wheel-brake cylinder of brake caliper 36a. A wheel-inlet valve 44b assigned to the wheel-brake cylinder of brake caliper 36b is likewise connected via a branch point 43 to line 42. Bypass lines having nonreturn valves 46a or 46b are configured in parallel to wheel-inlet valves 44a and 44b.

In addition, a delivery side of a pump 48 is connected via a branch point 47 to line 42. In one specific embodiment, pump 48 is a single-piston pump. However, a pump having a plurality of pistons, an asymmetrical pump or a gear-type pump may also be used for pump 48.

A line 50 extends from a suction side of pump 48 via a nonreturn valve 52 to a branch point 53 to which wheel-outlet valves 54a and 54b are coupled. A line 56, which leads to high-pressure switching valve 32, is also connected via a branch point to line 50. In addition, an accumulator chamber 58 communicates with line 50 via a branch point 57 between nonreturn valve 52 and branch point 53.

Wheel-outlet valves 54a and 54b are each assigned to a wheel-brake cylinder of a brake caliper 36a or 36b. For this purpose, wheel-outlet valves 54a and 54b are each connected via a line 59a or 59b to the wheel-brake cylinders of brake calipers 36a or 36b. Via one branch point each, wheel-inlet valve 44a or 44b assigned to particular wheel-brake caliper 36a or 36b is coupled to corresponding line 59a or 59b.

Valves 32, 34, 46a, 46b, 54a and 54b of front brake circuit 10 may also be designed as hydraulic valves. Changeover valve 34 and wheel-inlet valves 44a and 44b may be configured as normally open valves, and high-pressure switching valve 32 and wheel-outlet valves 54a and 54b as normally closed valves. Thus, a pressure buildup in the wheel-brake cylinders of brake calipers 36a and 36b requested on the driver side is reliably ensured in the normal braking operation of brake system 10. Correspondingly, built-up pressure in wheel-brake cylinders of brake calipers 36a and 36b may also be quickly reduced again. Thus, front brake circuit 10 corresponds to a standard ESP hydraulics.

Feed line 30 connects master brake cylinder 22 to a separator valve 60 of rear brake circuit 14. In contrast to changeover valve 34 of front brake circuit 10, no bypass line having a nonreturn valve is configured in parallel to separator valve 60 of rear brake circuit 14. In addition, feed line 30 does not have a branch point for coupling another component of rear brake circuit 14 to feed line 30. Thus, rear brake circuit 14 is designed to be decoupled from master brake cylinder 22 in response to a closing of separator valve 60. Thus, when separator valve 60 is closed, an intervention from master brake cylinder 22 to brake calipers 62a and 62b is no longer possible. Thus, the option is provided in a situation where it is so desired for separator valve 60 to be used to decouple rear brake circuit 14, including brake calipers 62a and 62b of wheels 16a and 16b, from master brake cylinder 22 (and brake pedal 18).

Rear brake circuit 14 encompasses a pressure-regulator valve 64, which, besides being adjustable to its closed state and to its open state, is also adjustable to at least one intermediate state between the closed state and the open state. In this intermediate state, pressure-regulator valve 64 is only partially open. Pressure-regulator valve 64 may be a continuously adjustable, normally closed valve. A valve of this kind may also be referred to as a PCV valve (pressure control valve). On the other hand, an inexpensive high-pressure switching valve 32, which is merely adjustable to the open or closed state, may be used for front brake circuit 10.

In addition, pressure-regulator valve 64 is connected via a branch point 65 to a line 66 leading to brake-medium reservoir 24. The direct coupling of pressure-regulator valve 64 to brake-medium reservoir 24 permits a more rapid reduction of a brake pressure that has built up in rear brake circuit 14.

In front brake circuit 10, a brake pressure that has built up may be reduced by filling the brake fluid into accumulator chamber 58. In this context, a minimum force must be applied that is great enough to press the brake fluid into accumulator chamber 58 against a pressure prevailing therein. This slows down the reduction of the brake pressure in front brake circuit 10. During "normal" braking, the pressure reduction is accomplished via valves 44a/46a, respectively 44b/46b. Only in the case of a feedback control, for example in the context of ABS, is the reduction accomplished in accumulator chamber 58 via wheel-outlet valves 54a and 54b.

The pressure, which counteracts an inflow of brake fluid into brake-medium reservoir 24, is lower than that prevailing in accumulator chamber 58. For that reason, a portion of the brake fluid is quickly transferable from rear brake circuit 14 into brake-medium reservoir 24.

Line 66 also connects brake-medium reservoir 24 to a branch point 67 to which two wheel-outlet valves 68a and 68b are coupled. Wheel-outlet valves 68a and 68b are each assigned to a wheel-brake cylinder of a brake caliper 62a or 62b.

A pump 70 is configured in parallel to pressure-regulator valve 64 via a branch point 69. Pump 71 may be a single-piston pump, a pump having a plurality of pistons, an asymmetrical pump or a gear-type pump. A line 72 is connected via a branch point 71a to a delivery side of pump 70, which, at branch point 71b, flows into a line 74 that leads from separator valve 60 to a wheel-inlet valve 76b.

A second wheel-inlet valve 76a of rear brake circuit 14 is connected via a branch point 75 to line 74. Bypass lines having nonreturn valves 78a and 78b are configured in parallel to wheel-inlet valves 76a and 76b. Wheel-inlet valves 76a and 76b are each connected via line 80a or 80b to the wheel-brake cylinders of braking caliper 62a or 62b. Wheel-outlet valves 68a and 68b are each connected via a branch point 82a or 82b to corresponding line 80a or 80b.

The two pumps 48 and 70 are seated on a common shaft that is operated by a motor 84. In one cost-effective specific embodiment, motor 84 may be designed to rotate in only one direction of rotation.

In summary, it may be concluded that pressure-regulator valve 64, together with the suction side (intake side) of pump 70 and the delivery side (secondary side) of outlet valves 68a and 68b, is connected directly to brake-medium reservoir 24. It is thus possible for a desired brake pressure to be adjusted at wheel-brake cylinders of brake calipers 62a and 62b of wheels 16a and 16b via pressure-regulator valve 64.

Valves 60, 64, 68a, 68b, 76a and 76b are hydraulic valves. In one specific embodiment, separator valve 60 and wheel-inlet valves 76a and 76b are normally open valves. In this case, pressure-regulator valve 64 and wheel-outlet valves 68a and 68b are advantageously designed as normally closed valves.

In addition, one procedure for operating rear brake circuit 14 is described:

In the unbraked case, valves 60, 64, 68a, 68b, 78a and 78b of rear brake circuit 14 are currentless. Thus, non-energized separator valve 60 is open, and the hydraulic connection between master brake cylinder 22 and rear brake circuit 14, respectively, between master brake cylinder 22 and wheel-brake cylinders of brake calipers 62a and 62b, is present.

Typically, only in situations where the driver actuates brake pedal 18 or another brake actuation torque, is a current signal supplied to valves 60, 64, 68a, 68b, 78a and 78b from a control (not sketched) of the brake system. In response to the supplied current signal, energized separator valve 60 is closed, whereby master brake cylinder 22 is decoupled from rear brake circuit 14. If this situation exists, then the driver only still executes a braking intervention into front brake circuit 10 via brake pedal 18.

At the same time, based on driver actuation of brake pedal 18, a suitable sensor system may be used to ascertain which total braking torque at wheels 12a, 12b, 16a and 16b is advantageous in view of the actual traffic situation. An actual brake pressure present at wheels 12a and 12b is subsequently determined. A difference in braking torque between the desired total braking torque and the braking torque exerted on wheels 12*a* and 12*b* may then be calculated via an evaluation device. The calculated difference in braking torque may then be actively adjusted by pump 70 and pressure-regulator valve 64 to wheels 16*a* and 16*b* to allow the driver's brake command to be optimally executed.

If the intention is to decrease the brake pressure that has built up in rear brake circuit 14, pressure-regulator valve 64 is then opened as a function of the decreasing brake command. At this point, a portion of the brake fluid may quickly flow from rear brake circuit 14 via pressure-regulator valve 64 into brake-medium reservoir 24.

In addition, it is explained exemplarily how the brake system illustrated in FIG. 1 may be used for a recuperative braking. To this end, rear brake circuit 14 is connected exemplarily to an electromotor functioning as a generator during the recuperative braking. Thus, during recuperative braking, a braking torque of the generator that is not constant acts on wheels 16*a* and 16*b*.

By employing a suitable sensor system, it is possible to ascertain which total braking torque is desired by the driver. In the same way, it is possible to ascertain the braking torques exerted on wheels 12*a* and 12*b* by the conventional friction brake and those exerted on wheels 16*a* and 16*b* by the recuperative brake. The difference in braking torque between the total braking torque desired by the driver and the braking torques being applied to wheels 12*a*, 12*b*, 16*a* and 16*b* may then be calculated by an evaluation device. This difference in braking torque is subsequently adjusted at wheels 16*a* and 16*b* in accordance with the procedure described above. The blending process described here is barely perceived by the driver and, therefore, does not degrade the ride comfort.

One specific embodiment provides for a delta-p control of pressure-regulator valve 64 to be used for adjusting the brake pressure at the rear axle. Alternatively, a pressure regulation of the brake pressure at the rear axle is possible. To this end, at least one pressure sensor is configured in the area of at least one of wheels 16*a* or 16*b* and/or in the rear axle circuit.

At the fallback level, all valves 60, 64, 68*a*, 68*b*, 78*a* and 78*b* are currentless. In the case of a defect at at least one of the two wheel-outlet valves 68*a* and 68*b* and/or of pressure-regulator valve 64, a brake fluid stream may flow directly into brake-medium reservoir 24. To prevent a complete failure of brake calipers 62*a* and 62*b*, the option is provided to monitor the function of the fallback level. In the process, a pressure gradient monitoring of the brake pressure present at wheels 16*a* and 16*b* may be performed. Accordingly, it is also possible to monitor the imperviousness of rear brake circuit 14.

The above paragraphs describe a recuperative braking process for braking using a brake system, to whose rear brake circuit 14 a generator is connected. It is self-evident that a similar process may also be carried out when the generator is connected to front brake circuit 14.

Using the described method, it is also possible to adjust a brake-force distribution at the wheels of the vehicle in the case of a braking during cornering and/or during a travel in reverse. Examples of this include the transversal acceleration-dependent brake-force distribution already referred to, the dynamic curve braking, and/or the increase in the brake force at the rear axle when braking during travel in reverse.

Figure 2:
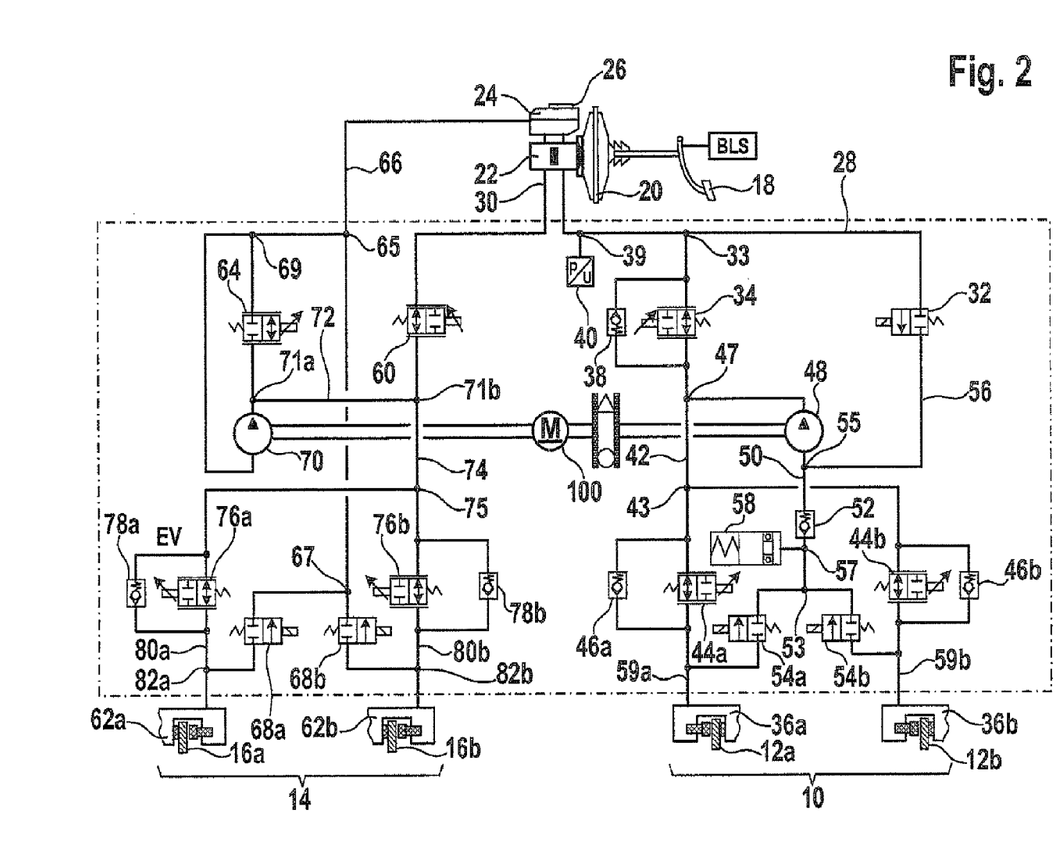
FIG. 2 shows a circuit diagram of a second specific embodiment of the brake system.

FIG. 2 shows a circuit diagram of a second specific embodiment of the brake system.

The brake system illustrated in FIG. 2 features the already described components 10 through 82 of the brake system of FIG. 1. However, in contrast to the brake system of FIG. 1, the brake system of FIG. 2 has a motor 100 that is rotatable in a first and in a second opposite direction of rotation. Thus, the motor path is equipped to allow motor 100 to run forwards and in reverse. In addition, a freewheeling device is configured between motor 100 and pump 48 of front brake circuit 10. The freewheeling device is designed to open as soon as motor 100 is operated in its first direction of rotation.

In a situation where a brake pressure is only to be built up at wheels 16*a* and 16*b*, motor 100 is operated in its first direction of rotation, which may be in reverse operation. Consequently, the freewheeling device opens, and the mechanical connection between motor 100 and pump 48 of front brake circuit 10 is interrupted. For this reason, in the case of an operation of motor 100 in its first direction of rotation, only pump 70 of rear brake circuit 14 is driven.

In this manner, a forced joint operation of pump 48 together with pump 70 is prevented, although both pumps 48 and 70 are seated on a common shaft and are drivable by same motor 100. This prevents a forced joint operation of pump 48 from resulting in an unnecessary volumetric delivery rate in front brake circuit 10. Normally, this unnecessary volumetric delivery rate in front brake circuit 10 is associated with pedal pulsations and/or pressure compensation processes. It is thus possible to enhance the driving comfort by preventing the forced joint operation of pump 48.

On the other hand, if an operation of both pumps 48 and 70 is desired, then motor 100 is operated in its second direction of rotation, which may be in a forward operation. Thus, in response to a rotation of motor 100 in its second direction of rotation, both pumps 48 and 70 are driven at the same speed. This makes possible a two-circuit pressure build-up and/or, for example, an ABS control.

Figure 3:
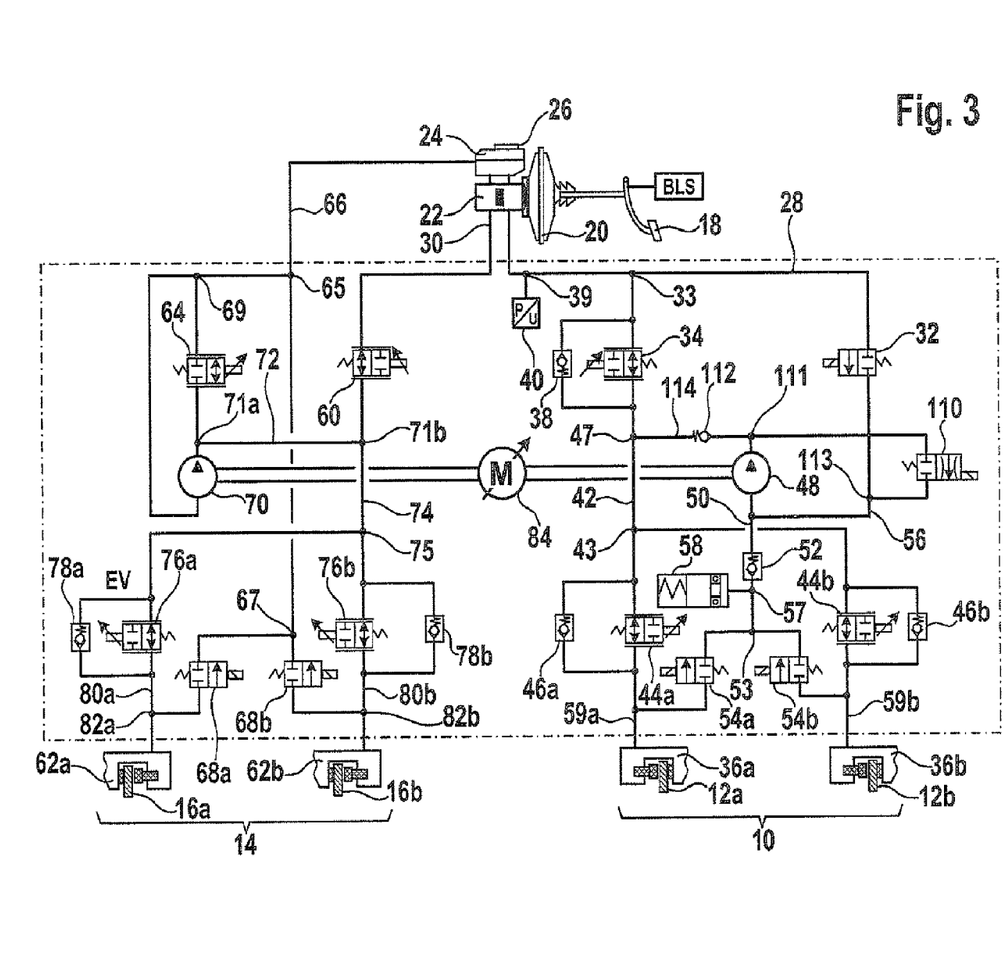
FIG. 3 shows a circuit diagram of a third specific embodiment of the brake system.

FIG. 3 shows a circuit diagram of a third specific embodiment of the brake system. This brake system is particularly well suited for an ABS control.

The brake system illustrated in FIG. 3 features the already described components 10 through 84 of the brake system of FIG. 1. To supplement the brake system of FIG. 1, the brake system of FIG. 2 additionally includes a valve 110 and a nonreturn valve 112.

Valve 110 is connected via a branch point 111 to a line 114 which leads from line 42 to an input of pump 48. In addition, valve 110 is coupled via a branch point 113 to line 56. By introducing valve 110 into front brake circuit 10, the delivery side (pump discharge side) of pump 48 is connected via valve 110 to suction side (pump intake side) of pump 48. Nonreturn valve 112 is installed in line 114.

In a situation where a pressure build-up is only desired at wheels 16*a* and 16*b*, valve 110 is open. In this manner, pump 48, which is operated via motor 84 together with pump 70, delivers only within the circuit and thereby prevents a pressure build-up at wheels 12*a* and 12*b*. Nonreturn valve 112 decouples the driver from the pump pulsation. In this manner, it is possible to minimize or prevent pedal pulsations, in spite of a forced joint operation of pump 48 together with pump 70.

If, on the other hand, a pressure build-up is desired at all wheels 12*a*, 12*b*, 16*a* and 16*b*, valve 110 is not driven and thus remains closed. In this case, an operation of motor 84 effects a pressure build-up in both brake circuits 10 and 14 during a driving of both pumps 48 and 70.

What is claimed is:

1. A brake system for a vehicle having wheels, comprising:

a master brake cylinder, which is configured for detecting an actuation of a brake input element and for supplying a pressure signal corresponding to the actuation of the brake input element;

a brake-medium reservoir for accommodating a brake medium that is connected to the master brake cylinder; and a first brake circuit, which is connected by a first input to the master brake cylinder and by a second input to the brake-medium reservoir, and which includes:

at least one first wheel-brake cylinder, which is mounted at a first wheel and is connected to the first input so that the pressure signal is transmittable from the master brake cylinder to the first wheel-brake cylinder, and which is configured to exert a force corresponding to the pressure signal onto the first wheel;

a separator valve, which is configured between the first input and the first wheel-brake cylinder, which is configured to prevent the pressure signal from being transmitted to the first wheel-brake cylinder upon receipt of a supplied closing signal; and     a control valve, which is configured between the second input and the first wheel-brake cylinder, which is designed for controlling an inflow of the brake medium from brake-medium reservoir to the first wheel-brake cylinder; and a second brake circuit, which is coupled to the master brake cylinder, having a second wheel-brake cylinder, which is mounted at a second wheel;

a suitable sensor system ascertaining, based on the driver actuation of a brake pedal, a total braking torque at the wheels; and an evaluation device to determine a difference in braking torque between the total braking torque and the braking torque exerted on the wheels of at least one of the first brake circuit and the second brake circuit;

wherein an electric drive motor, having a generator mode, is connected so as to recover electrical energy during recuperative braking of the wheels of the second brake circuit, wherein the pump and the control valve at the wheels of the first brake circuit are configured to actively adjust the braking torque to adjust the difference, and wherein the evaluation device is configured to determine the difference in braking torque between the total braking torque and the braking torque exerted on the wheels of the first brake circuit by a friction brake and a braking torque exerted on the wheels of the second brake circuit by a recuperative brake, wherein the first brake circuit is configured to regulate and/or compensate for changes in recuperative braking torque.

2. The brake system of claim 1, wherein the second brake circuit is not decouplable from the master brake cylinder.

3. The brake system of claim 1, wherein the control valve is adjustable to a closed state, an open state, and to at least one intermediate state between the closed state and the open state.

4. The brake system of claim 3, wherein the control valve is a continuously adjustable valve.

5. The brake system of claim 1, wherein a first branch point is configured between the second input of the first brake circuit and the control valve, and wherein the first wheel-brake cylinder is coupled to the first branch point so that an outflowing of the brake medium from the first wheel-brake cylinder is directed past the control valve to the brake-medium reservoir.

6. The brake system of claim 5, wherein a wheel-outlet valve is configured between the first branch point and the first wheel-brake cylinder that is configured to control the outflowing of the brake medium from the first wheel-brake cylinder past the control valve to the brake-medium reservoir.

7. The brake system of claim 1, wherein an output of the control valve and an output of the separator valve are coupled to a second branch point, and wherein a first wheel-inlet valve is configured between the second branch point and the first wheel-brake cylinder, which is configured to control an inflow of the brake medium from the second branch point to the first wheel-brake cylinder.

8. The brake system of claim 1, wherein a third branch point, to which a suction side of a first pump is coupled, is configured between the second input of the first brake circuit and the control valve, and wherein the delivery side of the first pump is coupled to the first wheel-inlet valve.

9. The brake system of claim 1, wherein the second brake circuit is coupled to the master brake cylinder, having a second wheel-brake cylinder, which is mounted at a second wheel and is connected to the master brake cylinder so that the pressure signal is transmittable from the master brake cylinder to the second wheel-brake cylinder, and which is configured to exert a force corresponding to the pressure signal onto the second wheel, and wherein the second brake circuit has a second pump.

10. The brake system of claim 9, wherein the electric drive motor is operable in a first direction of rotation and in a second direction of rotation, and wherein, in the case of an operation of the motor in the first direction of rotation, the first pump is operable by the electric drive motor, and the second pump is decoupled from the motor, and wherein, in the case of an operation of the electric drive motor in the second direction of rotation, the first and the second pump are operable by the electric drive motor.

11. A method for controlling a brake system for a vehicle, the method comprising:

receiving a supplied closing signal;

closing a separator valve to prevent a pressure signal from being transmitted from a master brake cylinder to a first wheel-brake cylinder;

receiving a supplied control signal indicating a brake pressure to be applied to the first wheel; and     controlling an inflow of a brake medium from a brake-medium reservoir to a first wheel-brake cylinder by a control valve to adjust the brake pressure at a first wheel;

wherein the brake system includes:

the master brake cylinder, which is configured for detecting an actuation of a brake input element, and for supplying the pressure signal corresponding to the actuation of the brake input element;

the brake-medium reservoir is configured for accommodating the brake medium;

a first brake circuit, which is coupled by a first input to the master brake cylinder and by a second input to the brake-medium reservoir;

a second brake circuit, which is connected to the master brake cylinder, having a second wheel-brake cylinder, which is mounted at a second wheel;

at least one first wheel-brake cylinder, which is mounted at a first wheel and is connected to the first input so that the pressure signal is transmittable from the master brake cylinder to the first wheel-brake cylinder, and which is configured to exert a force corresponding to the pressure signal onto the first wheel;

the separator valve, which is configured between the first input and the first wheel-brake cylinder;

the control valve, which is configured between the second input and the first wheel-brake cylinder;

wherein an electric drive motor, having a generator mode, is connected so as to recover electrical energy during recuperative braking of the wheels of the second brake circuit, wherein the pump and the control valve at the wheels of the first brake circuit are configured to actively adjust the braking torque to adjust the difference, wherein the evaluation device is configured to determine the difference in braking torque between the total braking torque and the braking torque exerted on the wheels of the first brake circuit by a friction brake and a braking torque exerted on the wheels of the second brake circuit by a recuperative brake, wherein the first brake circuit is configured to regulate and/or compensate for changes in recuperative braking torque.

* * * * *